US012108206B2

(12) United States Patent
Lin et al.

(10) Patent No.: US 12,108,206 B2
(45) Date of Patent: Oct. 1, 2024

(54) MICROPHONE ASSEMBLY WITH MULTIPLE DIRECTIVITIES

(71) Applicant: LANTO ELECTRONIC LIMITED, Kunshan (CN)

(72) Inventors: Yuxuan Lin, Kunshan (CN); Chiaofan Huang, Kunshan (CN); Kuanchun Liao, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 157 days.

(21) Appl. No.: 18/092,491

(22) Filed: Jan. 3, 2023

(65) Prior Publication Data

US 2024/0147145 A1 May 2, 2024

(30) Foreign Application Priority Data

Oct. 26, 2022 (CN) ........................ 202211317380.2

(51) Int. Cl.
*H04R 1/34* (2006.01)
*H04R 1/08* (2006.01)
*H04R 1/38* (2006.01)

(52) U.S. Cl.
CPC ............. *H04R 1/342* (2013.01); *H04R 1/083* (2013.01); *H04R 1/38* (2013.01)

(58) Field of Classification Search
CPC .......... H04R 1/083; H04R 1/342; H04R 1/38; H04R 1/222; H04R 1/326
See application file for complete search history.

(56) References Cited

U.S. PATENT DOCUMENTS 2,848,561 A * 8/1958 Gorike ..................... H04R 1/38 381/189

FOREIGN PATENT DOCUMENTS

| | | | |
|---|---|---|---|
| CN | 207603886 | U | 7/2018 |
| CN | 108401201 | A | 8/2018 |
| CN | 207995322 | U | 10/2018 |
| CN | 217283334 | U | 8/2022 |
| CN | 217522934 | U | 9/2022 |
| JP | 2000295687 | A | * 10/2000 |
| TW | M407565 | U1 | 7/2011 |

* cited by examiner

*Primary Examiner* — Kile O Blair
(74) *Attorney, Agent, or Firm* — Birch, Stewart, Kolasch & Birch, LLP

(57) ABSTRACT

A microphone assembly includes a microphone, an inner sleeve and an outer sleeve. The microphone has a shell, a diaphragm, a first sound receiving hole and a second sound receiving hole. The inner sleeve has a first hole and a second hole. The microphone is received between the first hole and the second hole. The inner sleeve is movable relative to the outer sleeve. The inner sleeve and the outer sleeve have at least two relative positions: in a first relative position, both the first hole and the second hole communicate with an outside environment; and in a second relative position, the first hole or the second hole communicates with the outside environment. The microphone assembly utilizes the relative movement of the inner sleeve and the outer sleeve to achieve directivity change.

20 Claims, 17 Drawing Sheets

MICROPHONE ASSEMBLY WITH MULTIPLE DIRECTIVITIES

CROSS-REFERENCE TO RELATED APPLICATION

This patent application claims priority of a Chinese Patent Application No. 202211317380.2, filed on Oct. 26, 2022 and titled "MICROPHONE ASSEMBLY", the entire content of which is incorporated herein by reference.

TECHNICAL FIELD

The present disclosure relates to a microphone assembly, which belongs to the technical field of electrical communication.

BACKGROUND

According to the acoustic principle, there are two kinds of microphones with pressure sensing type (or pressure type) and pressure gradient sensing type (or pressure difference type). The pressure sensing microphone has a hole on one side for receiving sound. No matter from which direction the sound wave is transmitted to the microphone, it can cause an internal diaphragm of the microphone to vibrate. Therefore, the pressure sensing microphone is an omni-directional microphone. The pressure gradient sensing microphone has openings on front and rear surfaces (two sides of the diaphragm) for receiving sound, and sound waves can be transmitted to the diaphragm from the front surface and the rear surface. Therefore, what the diaphragm senses is a pressure difference between a front sound wave and a rear sound wave on the diaphragm surface. When the sound source emits sound from the front of the microphone (0 degree condition), the sound wave will directly enter the microphone and reach the front of the diaphragm. In addition, there will be sound wave diffraction entering from the rear and reaching the rear of the diaphragm. Due to the different arrival times, the diaphragm will be forced to induce electrical signals. The situation is the same for 180 degrees. When the sound source is on the side (90 degrees or 270 degrees), because the sound waves transmitted from the front surface and the sound waves transmitted from the rear surface reach the diaphragm at almost the same time, they cancel each other out, and the diaphragm is not stressed, so no electrical signal is induced. The above forms a figure-of-eight bi-directionality with relatively large 0 degrees and 180 degrees, but almost no 90 degrees and 270 degrees. That is, the pressure gradient sensing microphone is a bi-directional microphone. Through the adjustment of the acoustic resistance, when the sound source is sounding at 0 degrees, the time for the sound waves coming in from the front surface and the sound waves coming in from the rear surface due to diffraction to reach the diaphragm is different, causing the diaphragm to sense electrical signals due to force. When the sound source emits sound from 180 degrees, the arrival time of the sound waves entering the two sides of the diaphragm is the same through the adjustment of the sound resistance, so they cancel each other out, thereby producing a uni-directional microphone (or a cardioid microphone) with sound waves at 0 degrees and no sound waves at 180 degrees.

In the related art, a microphone has only one definite directivity. For a microphone assembly, if you want to get multiple directivities, you need multiple microphones with control.

SUMMARY

An object of the present disclosure is to provide a microphone assembly with multiple directivities.

In order to achieve the above object, the present disclosure adopts the following technical solution: a microphone assembly, including: a microphone including a shell, a diaphragm, a first sound receiving hole and a second sound receiving hole; the diaphragm being accommodated in the shell; the first sound receiving hole being located on one side of the diaphragm, and the second sound receiving hole being located on another side of the diaphragm; an inner sleeve having a first hole and a second hole; the first hole and the second hole communicating with each other and extending through the inner sleeve; the microphone being accommodated between the first hole and the second hole; the first sound receiving hole being exposed to the first hole, and the second sound receiving hole being exposed to the second hole; and an outer sleeve having a receiving space, the inner sleeve being accommodated in the receiving space, and the inner sleeve being movable relative to the outer sleeve; wherein the inner sleeve and the outer sleeve have at least two relative positions; and wherein in a first relative position, both the first hole and the second hole communicate with an outside environment; and in a second relative position, the first hole or the second hole communicates with the outside environment.

In order to achieve the above object, the present disclosure adopts the following technical solution: a microphone assembly, including: a microphone including a shell, a diaphragm, a first sound receiving hole and a second sound receiving hole; the first sound receiving hole and the second sound receiving hole being located opposite sides of the diaphragm; an inner sleeve having a first hole and a second hole which is coaxial with the first hole; the microphone being accommodated between the first hole and the second hole; the first sound receiving hole being exposed to the first hole, and the second sound receiving hole being exposed to the second hole; and an outer sleeve having a receiving space, the inner sleeve being accommodated in the receiving space, and the inner sleeve being movable relative to the outer sleeve; wherein the inner sleeve and the outer sleeve have at least two relative positions; and wherein in a first relative position, both the first hole and the second hole communicate with an outside environment; and in a second relative position, the first hole or the second hole communicates with the outside environment.

Compared with related technologies, the present disclosure has the following advantages: by providing the inner sleeve and the outer sleeve which are relatively movable on a periphery of the microphone, the transition of using the sound receiving holes on a front surface and/or a rear surface of the microphone for receiving sound is realized, thereby changing the overall directivity of the microphone assembly. The microphone assembly only needs one microphone to obtain multiple directivities, which has a simple structure and low manufacturing cost.

DETAILED DESCRIPTION

Figure 1:
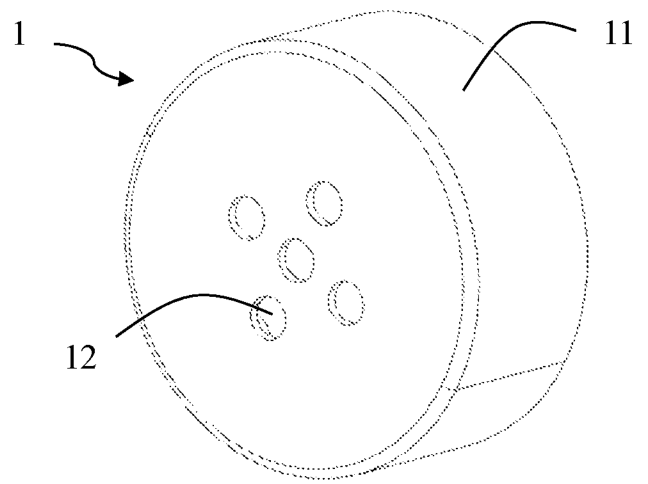
FIG. 1 is a structural schematic view of a microphone of a microphone assembly at an angle in accordance with a first embodiment of the present disclosure.
Figure 2:
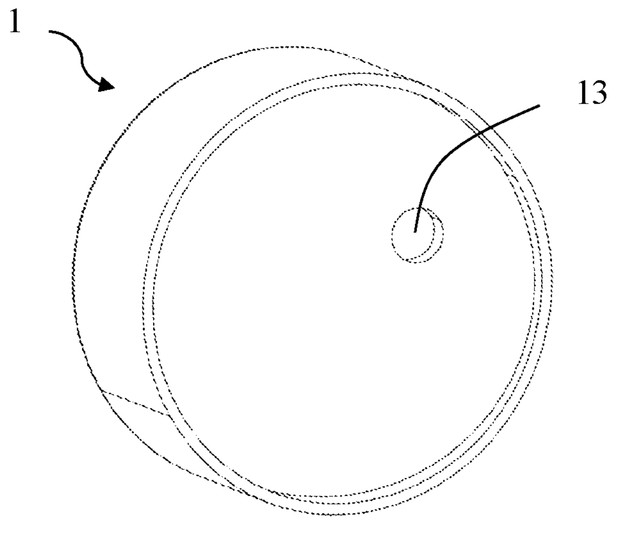
FIG. 2 is a structural schematic view of the microphone of the microphone assembly at another angle in accordance with the first embodiment of the present disclosure.
Figure 3:
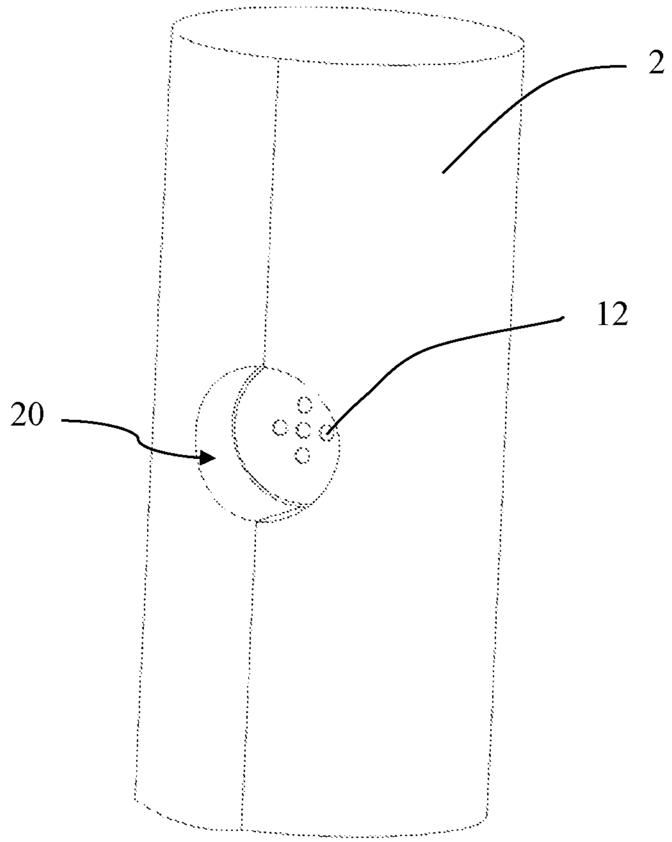
FIG. 3 is a schematic view of coordination and structure of the microphone and an inner sleeve of the microphone assembly at an angle in accordance with the first embodiment of the present disclosure.
Figure 4:
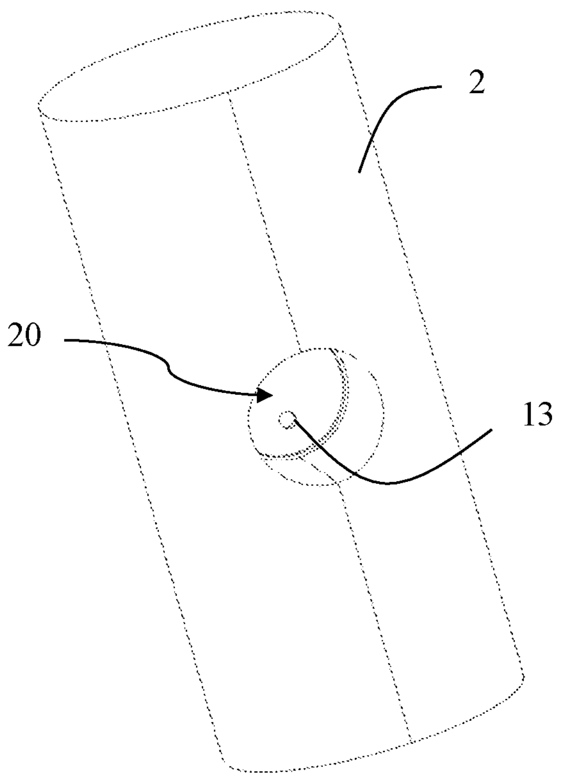
FIG. 4 is a schematic view of coordination and structure of the microphone and the inner sleeve of the microphone assembly at another angle in accordance with the first embodiment of the present disclosure.
Figure 5:
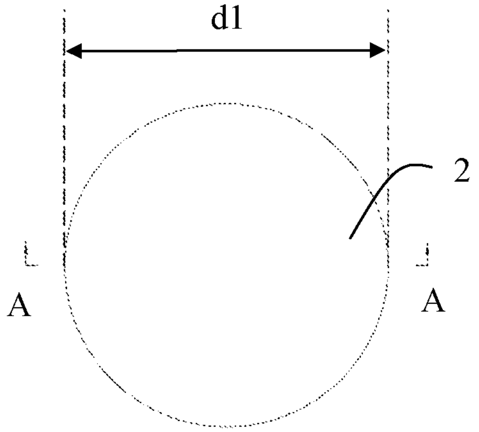
FIG. 5 is a schematic top view of the microphone and the inner sleeve of the microphone assembly in accordance with the first embodiment of the present disclosure.
Figure 6:
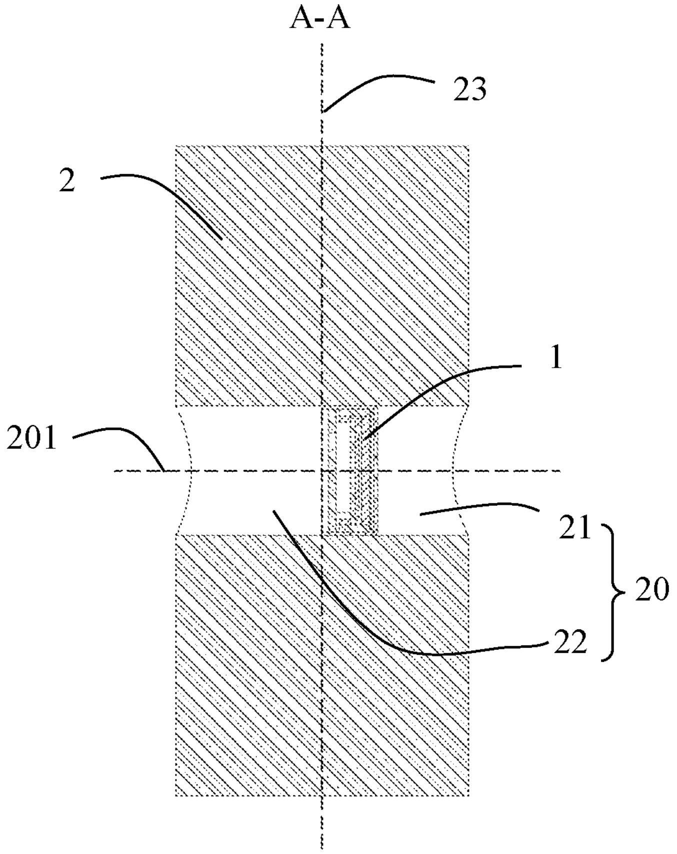
FIG. 6 is a cross-sectional view taken along line A-A of FIG. 5.
Figure 7:
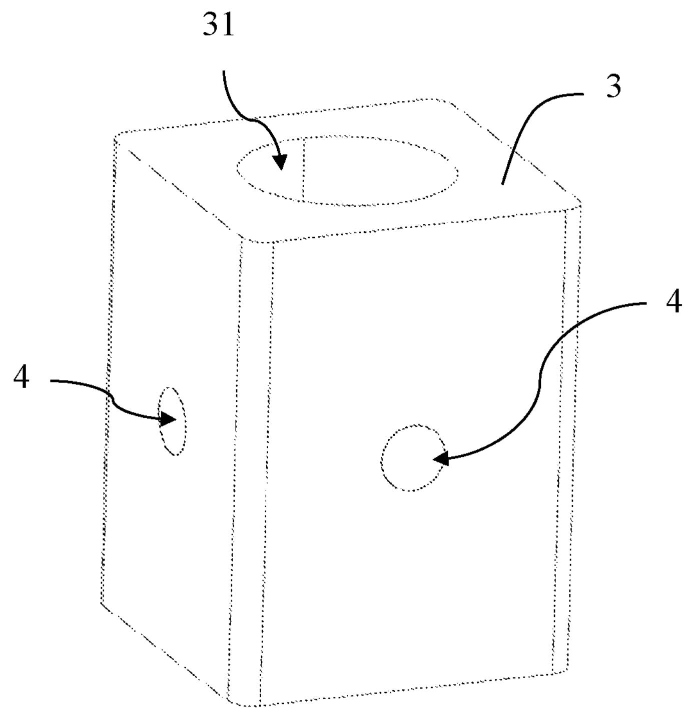
FIG. 7 is a structural schematic view of an outer sleeve of the microphone assembly at an angle in accordance with the first embodiment of the present disclosure.
Figure 8:
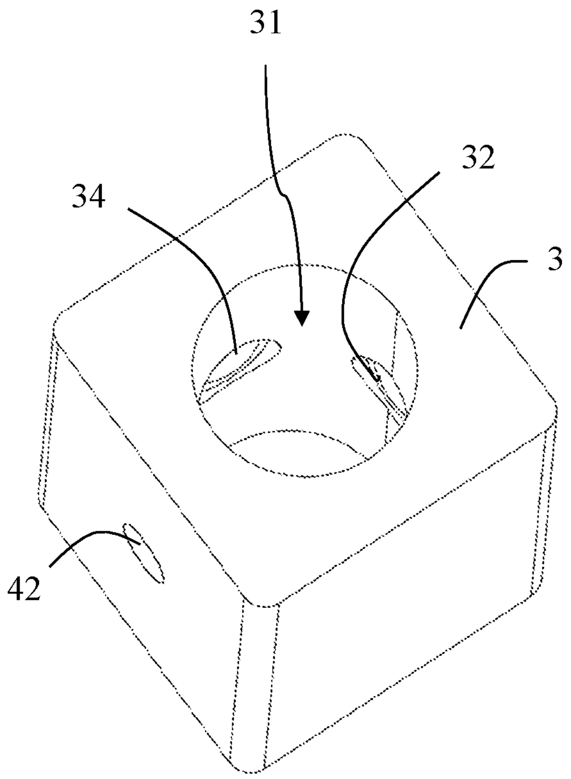
FIG. 8 is a structural schematic view of the outer sleeve of the microphone assembly at another angle in accordance with the first embodiment of the present disclosure.
Figure 9B:
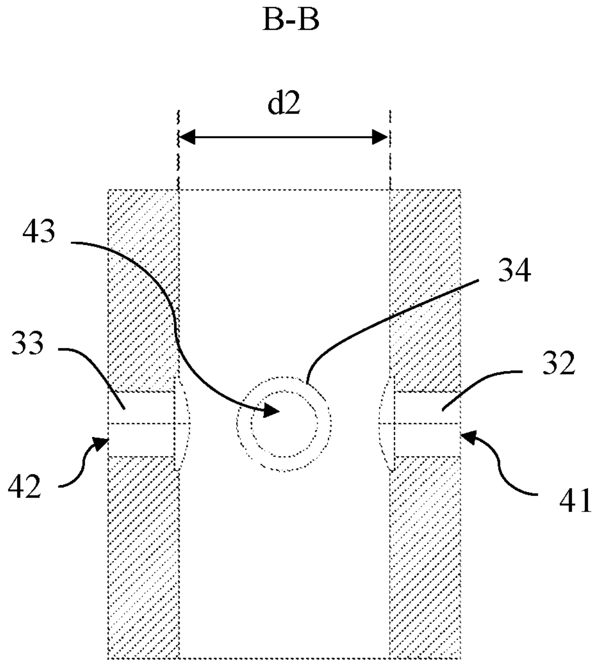
FIG. 9*b* is a cross-sectional view taken along line B-B of FIG. 9*a;*
Figure 9A:
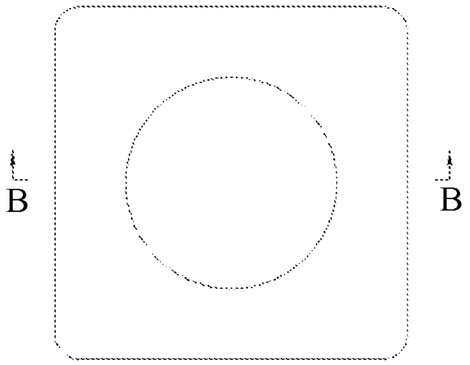
FIG. 9*a* is a schematic top view of the outer sleeve of the microphone assembly in accordance with the first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

The present disclosure discloses a microphone assembly which includes a microphone 1, an inner sleeve 2 and an outer sleeve 3. FIGS. 1 to 13 correspond to a first embodiment of the present disclosure, and FIGS. 15 to 21 correspond to a second embodiment of the present disclosure. Specific embodiments of the present disclosure will be introduced below in conjunction with the accompanying drawings.

It is known in the related art that the microphone 1 generally includes a shell 11 and a diaphragm (not shown in the drawings) accommodated in the shell 11. In the first embodiment shown in the drawings, the microphone 1 further includes a first sound receiving hole 12 located on one side of the shell 11, and a second sound receiving hole 13 located on the other side of the shell 11. In the first embodiment shown in the drawings, the microphone 1 is a uni-directional microphone. There are five first sound receiving holes 12 and one second sound receiving hole 13.

For convenience of description, in the following description, a side of the microphone 1 having the five first sound receiving holes 12 is referred to as a front surface of the microphone 1. A side of the microphone 1 with the second sound receiving hole 13 is referred to as a rear surface of the microphone 1. A surface connecting the front surface and the rear surface is a peripheral side surface.

In the first embodiment, the inner sleeve 2 is substantially of a cylindrical configuration. The cylindrical configuration has a first axis 23, see FIG. 6. The inner sleeve 2 has a through hole 20. An axis 201 of the through hole 20 is perpendicular to and intersects with the first axis 23. Viewed along a direction of the first axis 23, the through hole 20 is located in a middle of the inner sleeve 2.

The microphone 1 is located in the through hole 20. Optionally, the peripheral side surface of the microphone 1 is fixed to a hole wall surrounding the through hole 20. The first sound receiving hole 12 faces one end of the through hole 20, and the second sound receiving hole 13 faces the other end of the through hole 20.

For convenience of description, the through hole 20 can be considered to be composed of two holes: a first hole 21 and a second hole 22.

In other embodiments of the present disclosure, the inner sleeve 2 has two holes: a first hole 21 and a second hole 22. The first hole 21 and the second hole 22 communicate with each other, and extend through the inner sleeve 2. The first axis 23 is perpendicular to an axis of the first hole 21 and an axis of the second hole 22.

The microphone 1 is accommodated between the first hole 21 and the second hole 22. The first sound receiving hole 12 of the microphone 1 is exposed to the first hole 21. The second sound receiving hole 13 of the microphone 1 is exposed to the second hole 22. The external sound can be transmitted to the first sound receiving hole 12 through the first hole 21, transmitted to the second sound receiving hole 13 through the second hole 22, and then transmitted to an inside of the microphone 1, so as to cause the diaphragm to vibrate, which is then converted into a corresponding electrical signal.

Since the structure of the inner sleeve 2 affects the propagation of sound waves, the combination of the inner sleeve 2 and the microphone 1 as a whole exhibits a similar bi-directional effect.

The outer sleeve 3 has a receiving space 31. The inner sleeve 2 can be accommodated in the receiving space 31. As shown in FIGS. 7 to 13, the receiving space 31 is a cylindrical hole, and the receiving space 31 matches an outer circumference of the inner sleeve 2. Optionally, a diameter d2 of the receiving space 31 is equal to or slightly larger than a diameter d1 of the inner sleeve 2. When the diameter d1 and the diameter d2 are equal, the receiving space 31 and the inner sleeve 2 are clearance fit.

In the first embodiment, the receiving space 31 is a through hole. After the inner sleeve 2 is accommodated in the receiving space 31, two end surfaces of the inner sleeve 2 are exposed to outside air. When the relative position between the inner sleeve 2 and the outer sleeve 3 needs to be changed relatively, one of them can be fixed and the other can be rotated.

Figure 14:
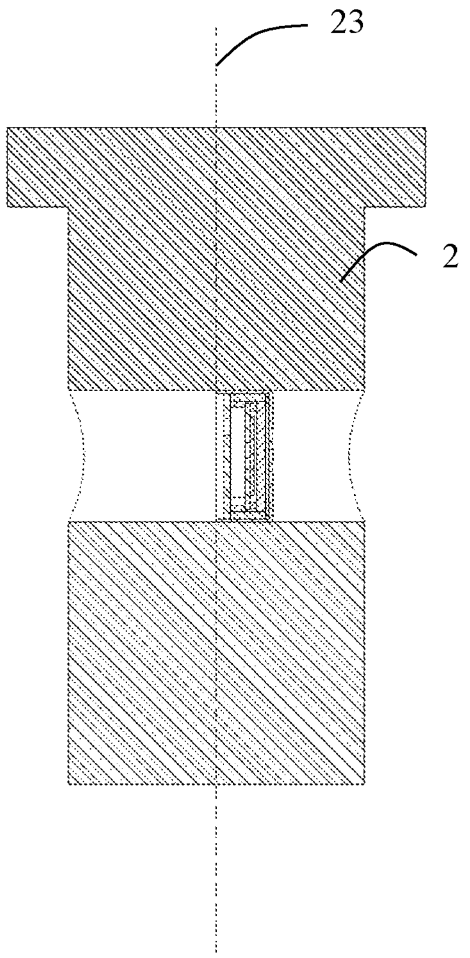
FIG. 14 is a schematic view of the inner sleeve of the microphone assembly in accordance with another embodiment of the present disclosure.
Figure 15:
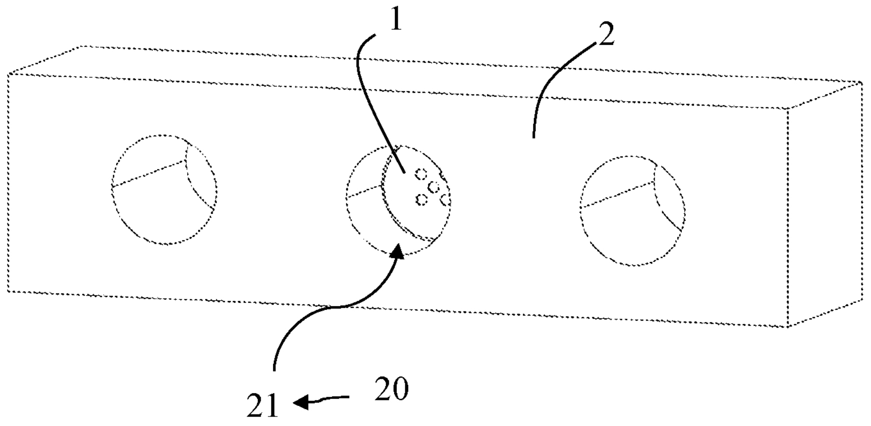
FIG. 15 is a schematic view of coordination and structure of the inner sleeve and the microphone at an angle of the microphone assembly in accordance with a second embodiment of the present disclosure.
Figure 16:
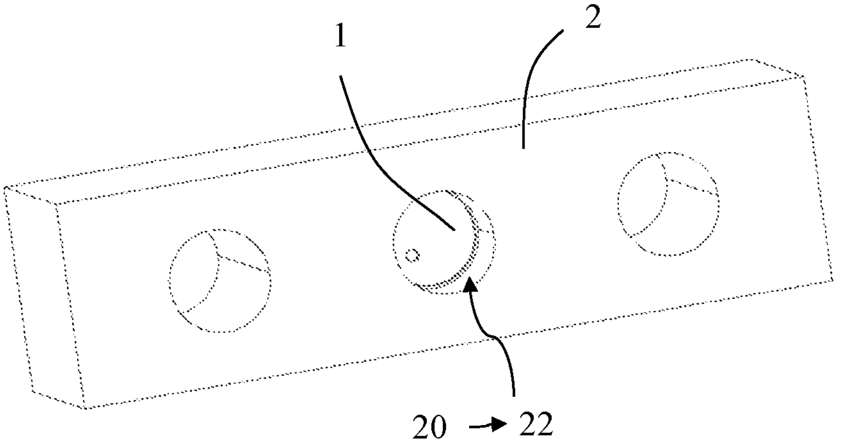
FIG. 16 is a schematic view of coordination and structure of the inner sleeve and the microphone at another angle of the microphone assembly in accordance with the second embodiment of the present disclosure.

Referring to FIG. 14, in order to position the inner sleeve 2 relative to the outer sleeve 3 in a direction along the first axis 23, one end (for example, an upper end in FIG. 14) of the inner sleeve 2 can be set in a form of an stepped axis. It should be understood that correspondingly, the receiving space 31 should also be a matching stepped hole.

Continuing to refer to FIG. 7 to FIG. 13, in the first embodiment, the outer sleeve 3 further includes a third hole 32, a fourth hole 33 and a fifth hole 34. One ends of the third hole 32, the fourth hole 33 and the fifth hole 34 communicate with an outside of the outer sleeve 3, and another ends of the third hole 32, the fourth hole 33 and the fifth hole 34 communicate with the receiving space 31. Viewed at one end of the first axis 23, the third hole 32 and the fourth hole 33 are separated by 180°, and the fifth hole 34 is located between the third hole 32 and the fourth hole 33. In the drawings, the fifth hole 34 is 90° apart from the third hole 32 and the fourth hole 33. Viewed along the first axis 23, the third hole 32, the fourth hole 33 and the fifth hole 34 are all located in the middle of the outer sleeve 3.

Figure 10B:
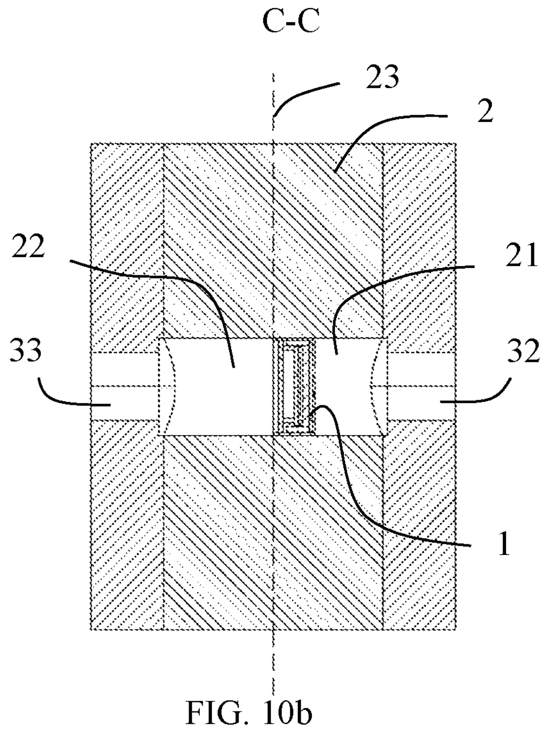
FIG. 10*b* is a cross-sectional view taken along line C-C of FIG. 10*a;*
Figure 10A:
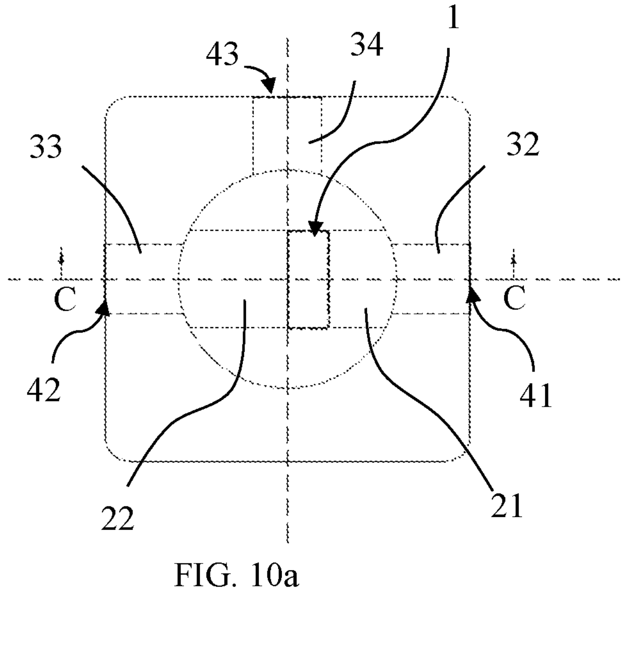
FIG. 10*a* is a schematic top view of the microphone assembly in accordance with the first embodiment of the present disclosure, wherein the inner sleeve and the outer sleeve are in a first relative position.

Rotating the inner sleeve 2 or the outer sleeve 3: referring to FIG. 10, in a first relative position, the first hole 21 of the inner sleeve 2 communicates with the third hole 32; and the second hole 22 communicates with the fourth hole 33. The external sound will be transmitted to the first hole 21 and the second hole 22 through the third hole 32 and the fourth hole 33, respectively; and then transmitted to the first sound receiving hole 12 and the second sound receiving hole 13, respectively. At this time, the overall performance of the microphone assembly is approximately bi-directional, because the structures of the inner sleeve 2 and the outer sleeve 3 affect the transmission of sound waves.

Figure 11:
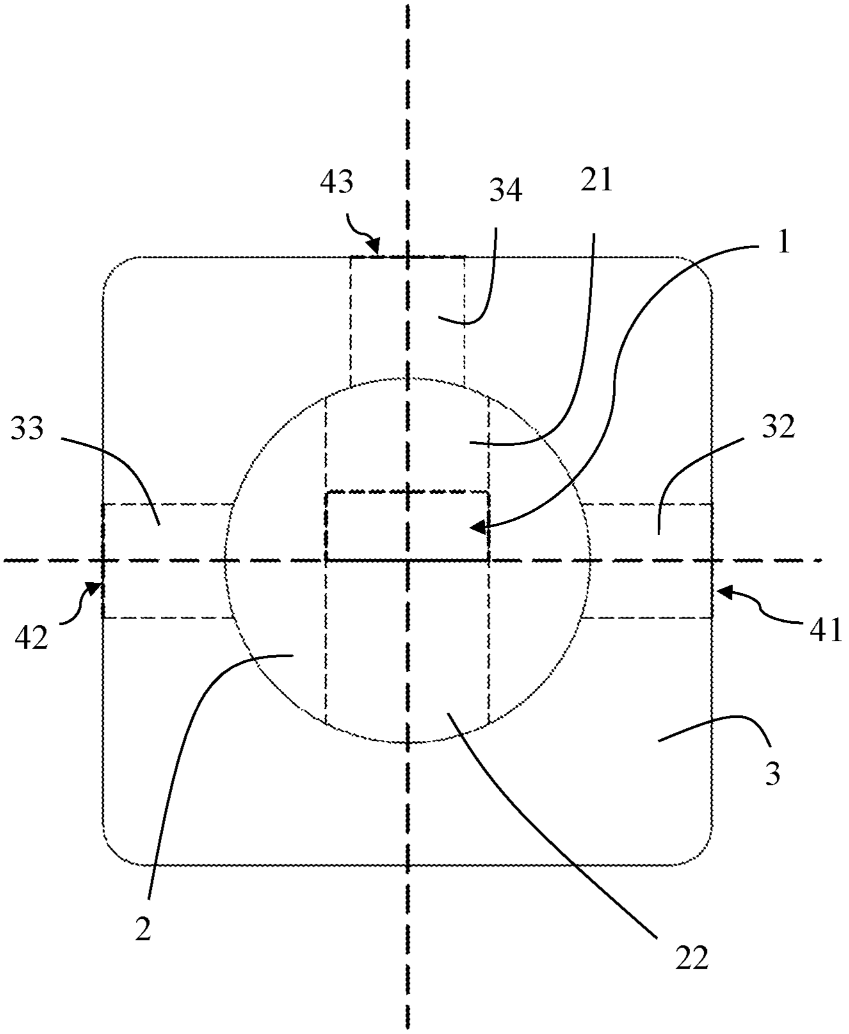
FIG. 11 is a schematic top view of the microphone assembly in accordance with the first embodiment of the present disclosure, wherein the inner sleeve and the outer sleeve are in a second relative position.

Continue to rotate the inner sleeve 2 or the outer sleeve 3 by about 90°. The inner sleeve 2 and the outer sleeve 3 are in a second relative position. Referring to FIG. 11, in the second relative position: the first hole 21 communicates with the fifth hole 34, and the second hole 22 is blocked by the outer sleeve 3. At this time, the external sound can only enter the microphone 1 through the fifth hole 34, and then through the first hole 21 and the first sound receiving hole 12 in sequence. The microphone assembly as a whole is omni-directional at this time.

Figure 12:
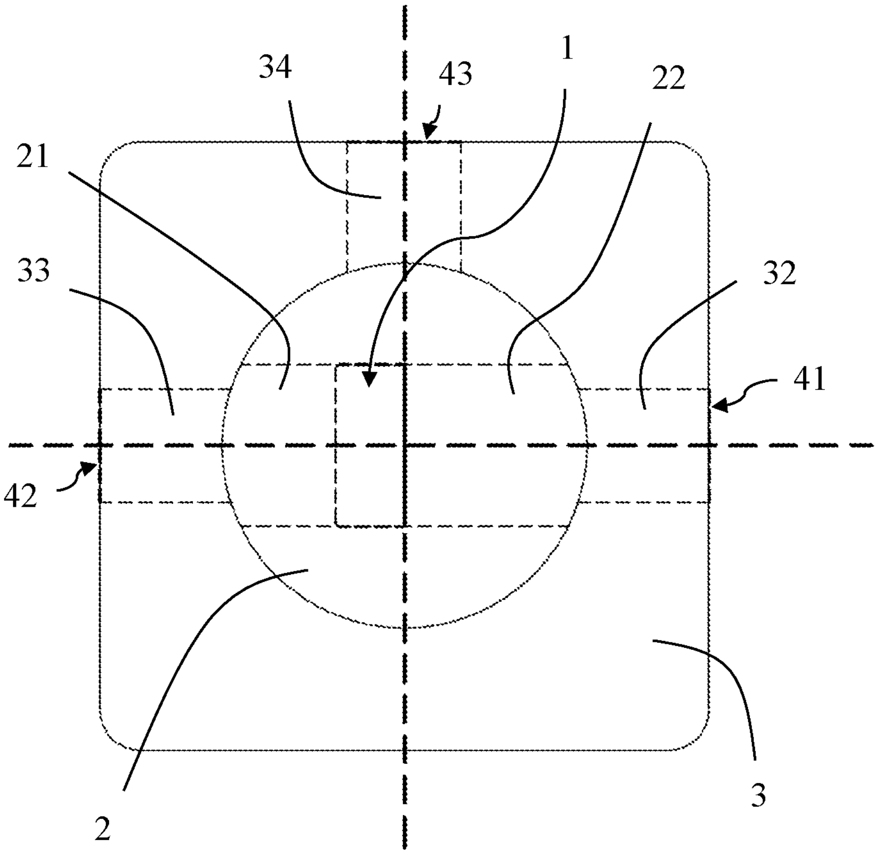
FIG. 12 is a schematic top view of the microphone assembly in accordance with the first embodiment of the present disclosure, wherein the inner sleeve and the outer sleeve are in a third relative position.

Continue to rotate the inner sleeve 2 or the outer sleeve 3 by about 90°. The inner sleeve 2 and the outer sleeve 3 are in a third relative position. Referring to FIG. 12, this position is similar to the first relative position, both of which enable the first hole 21 and the second hole 22 to communicate with the outside environment. The first hole 21 communicates with the fourth hole 33, and the second hole 22 communicates with the third hole 32. When no acoustic mesh is provided in the third hole 32 and the fourth hole 33, or acoustic impedances of the acoustic meshes provided in the third hole 32 and the fourth hole 33 are the same, the effect of the third relative position is the same as that of the first relative position, and the overall performance of the microphone assembly tends to be bi-directional. Because the uni-directional microphone is installed in the inner sleeve 2 and the outer sleeve 3, the original uni-directional effect of the microphone will be destroyed by the structure of the inner sleeve 2 and the outer sleeve 3, and then appear to be close to bi-directional.

Figure 13:
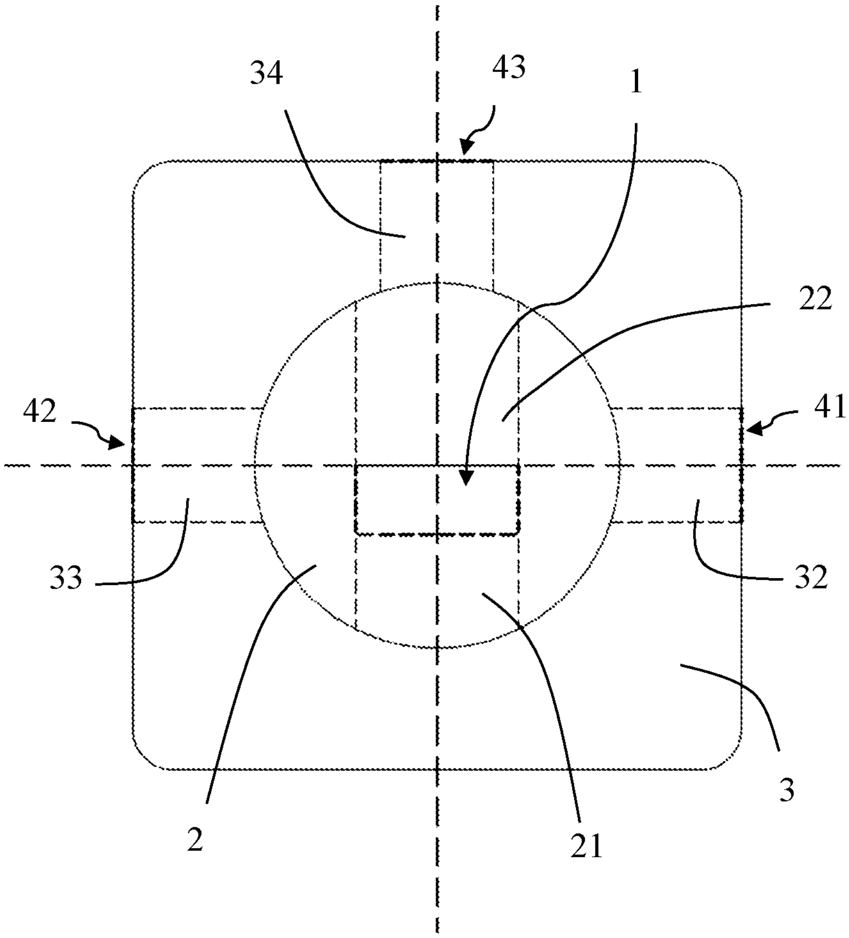
FIG. 13 is a schematic top view of the microphone assembly in accordance with the first embodiment of the present disclosure, wherein the inner sleeve and the outer sleeve are in a fourth relative position.

Continue to rotate the inner sleeve 2 or the outer sleeve 3 by about 90°. The inner sleeve 2 and the outer sleeve 3 are in a fourth relative position. Referring to FIG. 13, in the fourth relative position, the first hole 21 is blocked by the outer sleeve 3; the second hole 22 communicates with the fifth hole 34; and the overall performance of the microphone assembly is omni-directional, which is similar to that when the inner sleeve 2 and the outer sleeve 3 are in the second relative position. The difference is that the microphone 1 itself is a uni-directional microphone. When the inner sleeve 2 and the outer sleeve 3 are in the second relative position, the sound collection effect is better.

The microphone assembly further includes acoustic meshes 4 which are fixed in the third hole 32, the fourth hole 33 and the fifth hole 34. In the first embodiment, the acoustic meshes 4 are arranged on positions of the third hole 32, the fourth hole 33 and the fifth hole 34 close to an outer surface of the outer sleeve 3.

The acoustic impedances of the acoustic meshes 4 located in the third hole 32, the fourth hole 33 and the fifth hole 34 are different, which plays a role in adjusting the overall directivity of the microphone assembly.

Specifically, in the first embodiment, the acoustic impedance of the first acoustic mesh 41 located in the third hole 32 is 255 rayl; the acoustic impedance of the second acoustic mesh 42 located in the fourth hole 33 is 808 rayl; and the acoustic impedance of the third acoustic mesh 43 located in the fifth hole 34 is 255 rayl.

When the inner sleeve 2 and the outer sleeve 3 are in the first relative position, referring to FIG. 10, when the acoustic mesh 4 is not provided or the acoustic impedances of the acoustic meshes 4 are the same, the microphone assembly as a whole exhibits approximately bi-directionality. After the first acoustic mesh 41 (with smaller acoustic impedance) is arranged in the third hole 32, and the second acoustic mesh 42 (with larger acoustic impedance) is arranged in the fourth hole 33, the propagation of sound waves will be affected by the first acoustic mesh 41 and the second acoustic mesh 42. As a result, when the sound source is sounding directly at a place facing the third hole 32, the arrival time of the sound wave transmitted to the front surface of the microphone 1 by the third hole 32 and the first hole 21, and the arrival time of the sound wave transmitted to the rear surface of the microphone 1 by the fourth hole 33 and the second hole 22 are different, which causes the force on the diaphragm to sense an electrical signal. And when the sound source is sounding directly at a place facing the fourth hole 33, the arrival time of the sound wave transmitted to the rear surface of the microphone 1 by the fourth hole 33 and the second hole 22, and the arrival time of the sound wave transmitted to the front surface of the microphone 1 by the third hole 32 and the first hole 21 are the same, which cancel each other out, so that the microphone assembly as a whole exhibits a uni-directional effect.

When the inner sleeve 2 and the outer sleeve 3 are in the second relative position, referring to FIG. 11, the sound wave enters the microphone 1 only from the front surface of the microphone 1. Therefore, the microphone assembly as a whole exhibits an omni-directional effect.

When the inner sleeve 2 and the outer sleeve 3 are in the third relative position, referring to FIG. 12, the front surface of the microphone 1 communicates with the fourth hole 33, and the acoustic impedance of the second acoustic mesh 42 is large. The rear surface of the microphone 1 communicates with the third hole 32, while the acoustic impedance of the first acoustic mesh 41 is small, and the microphone assembly as a whole exhibits close to a bi-directional effect.

When the inner sleeve 2 and the outer sleeve 3 are in the fourth relative position, referring to FIG. 13, the front surface of the microphone 1 is blocked, and the sound wave enters the microphone 1 only from the rear surface of the microphone 1. Therefore, the microphone assembly as a whole is omni-directional.

In the foregoing embodiments, the inner sleeve 2 is of a cylindrical configuration. In other embodiments of the present disclosure, the inner sleeve 2 may also be of a frustum-shaped configuration or other configurations that facilitate rotation.

In the foregoing embodiments, the first hole 21 and the second hole 22 are coaxial. In other embodiments of the present disclosure, the first hole 21 and the second hole 22 may also be non-coaxial. For example, when the first sound receiving hole 12 of the microphone 1 is located in the front surface of the microphone 1, and the second sound receiving hole 13 is located on the peripheral side surface of the microphone 1, in order to communicate with the first sound receiving hole 12 and the first hole 21, and communicate with the second sound receiving hole 13 and the second hole 22, the axis of the first hole 21 may be set perpendicular to the axis of the second hole 22. It should be understood that when the first sound receiving hole 12 of the microphone 1 is located in the front surface of the microphone 1, and the second sound receiving hole 13 is located on the peripheral side surface of the microphone 1, the first hole 21 and the second hole 22 may also be coaxial. It is only necessary to provide an auxiliary channel on the inner sleeve 2 or the outer sleeve 3 to communicate with the second sound receiving hole 13 and the second hole 22.

In the foregoing embodiments, the first axis 23 is perpendicular to the axis of the first hole 21, and the first axis 23 is perpendicular to the axis of the second hole 22. In other embodiments of the present disclosure, an included angle between the first axis 23 and the first hole 21 may be an acute angle (non-perpendicular, which may also be understood as an obtuse angle). Likewise, an included angle between the first axis 23 and the second hole 22 may also be an acute angle. Optionally, along the direction of the first axis 23, heights of the first hole 21 and the second hole 22 are the same. That is, the included angle between the first axis 23 and the first hole 21 is equal to the included angle between the first axis 23 and the second hole 22.

Figure 17:
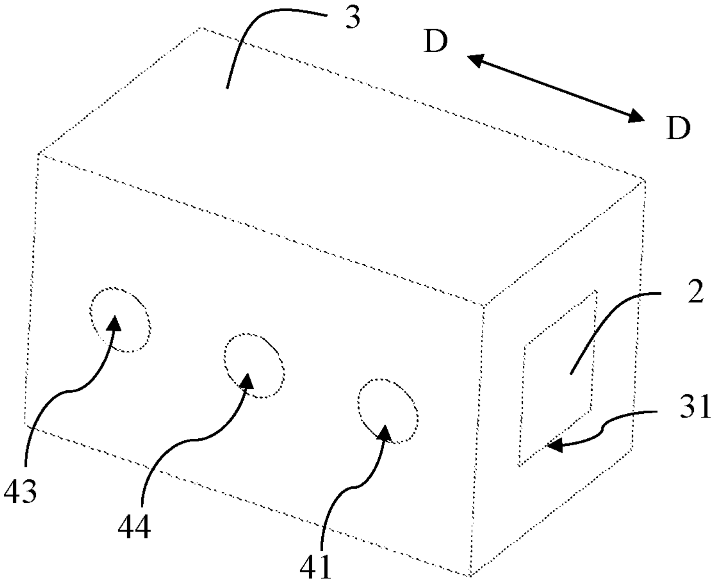
FIG. 17 is a structural schematic view at an angle of the microphone assembly in accordance with the second embodiment of the present disclosure.
Figure 18:
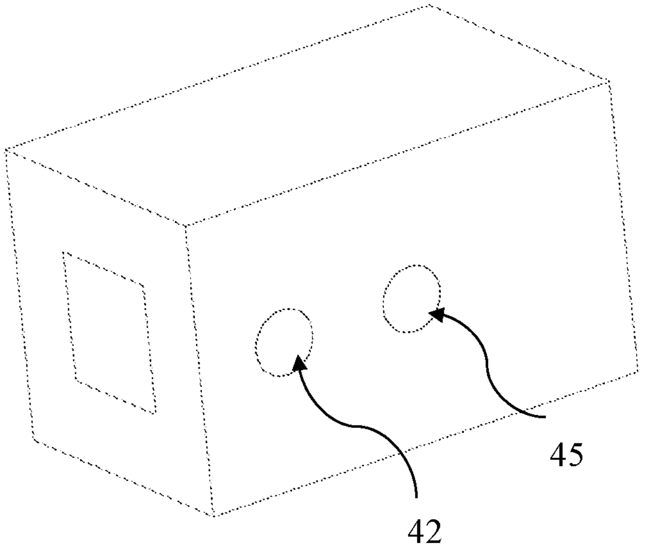
FIG. 18 is a structural schematic view at another angle of the microphone assembly in accordance with the second embodiment of the present disclosure.

In the second embodiment of the present disclosure, the inner sleeve 2 can translate relative to the outer sleeve 3 along a direction D-D in FIG. 17.

The following will mainly introduce the differences between the second embodiment and the first embodiment. In addition, the second embodiment uses the same reference numerals as the corresponding elements in the first embodiment.

Referring to FIG. 15 to FIG. 21, the inner sleeve 2 is in a shape of a quadrangular prism and has a through hole 20. The microphone 1 is fixed in the through hole 20. Likewise, the through hole 20 can also be set as two communicated holes: a first hole 21 and a second hole 22. The front surface of the microphone 1 faces the first hole 21, and the first sound receiving 12 is exposed in the first hole 21. The rear surface of the microphone 1 faces the second hole 22, and the second sound receiving 13 is exposed in the second hole 22.

An axis of the through hole 20 is perpendicular to the direction D-D.

The outer sleeve 3 has a receiving space 31. The receiving space 31 is of a prism-shaped configuration, which matches the outer circumference of the inner sleeve 2.

There are three groups of holes in the outer sleeve 3. The first set of holes includes a third hole 32 and a fourth hole 33, and the third hole 32 and the fourth hole 33 communicate with each other. The second set of holes includes a fifth hole 34. The third set of holes includes a sixth hole 35 and a seventh hole 36, and the sixth hole 35 and the seventh hole 36 communicate with each other.

Wherein, the first set of holes and the third set of holes each include two communicated holes for communicating with the first hole 21 and the second hole 22, respectively, so that the microphone 1 can receive sound from the front surface and the rear surface.

Figure 19:
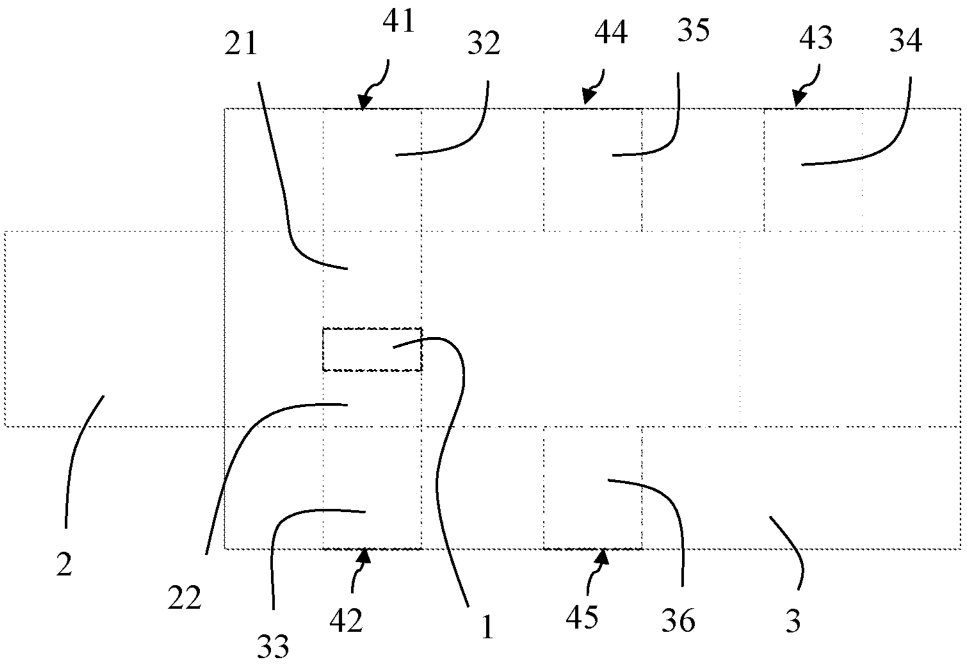
FIG. 19 is a schematic top view of the inner sleeve and the outer sleeve in a first relative position of the microphone assembly in accordance with the second embodiment of the present disclosure, wherein relative positions of internal structures of the microphone assembly are indicated by dotted lines.

Specifically, when the inner sleeve 2 and the outer sleeve 3 are in the first relative position, referring to FIG. 19, the first hole 21 communicates with the third hole 32, and the second hole 22 communicates with the fourth hole 33. When the inner sleeve 2 and the outer sleeve 3 are in the second relative position, referring to FIG. 21, the first hole 21 communicates with the fifth hole 34, and the second hole 22 is blocked by the outer sleeve 3. When the inner sleeve 2 and the outer sleeve 3 are in the third relative position, referring to FIG. 20, the first hole 21 communicates with the sixth hole 35, and the second hole 22 communicates with the seventh hole 36.

When there is no acoustic mesh 4 in the third hole 32, the fourth hole 33, the sixth hole 35, and the seventh hole 36, or the acoustic impedances of the acoustic meshes 4 located in the third hole 32, the fourth hole 33, the sixth hole 35, and the seventh hole 36 are the same, at the first relative position and the third relative position, the overall directivity performance of the microphone components is consistent, and they are both close to bi-directional. In the second embodiment of the present disclosure, the third hole 32, the fourth hole 33, the fifth hole 34, the sixth hole 35 and the seventh hole 36 are all provided with acoustic meshes 4 which are a first acoustic mesh 41, a second acoustic mesh 42, a third acoustic mesh 43, a fourth acoustic mesh 44 and a fifth acoustic mesh 45, respectively. The first acoustic mesh 41, the third acoustic mesh 43 and the fourth acoustic mesh 44 are located on a same side of the outer sleeve 3. The second acoustic mesh 42 and the fifth acoustic mesh 45 are located on a same side of the outer sleeve 3.

The acoustic impedances of the first acoustic mesh 41 and the fifth acoustic mesh 45 are the same, for example, 255 rayl. The acoustic impedances of the second acoustic mesh 42 and the fourth acoustic mesh 44 are the same, for example, 808 rayl. The acoustic impedance of the third acoustic mesh 43 may be 255 rayl.

When the inner sleeve 2 and the outer sleeve 3 are in the first relative position, referring to FIG. 19, the first hole 21 communicates with the third hole 32, and the acoustic impedance of the first acoustic mesh 41 is small; the second hole 22 communicates with the fourth hole 33, and the acoustic impedance of the second acoustic mesh 42 is large. The microphone assembly as a whole exhibits a uni-directional effect.

Figure 21:
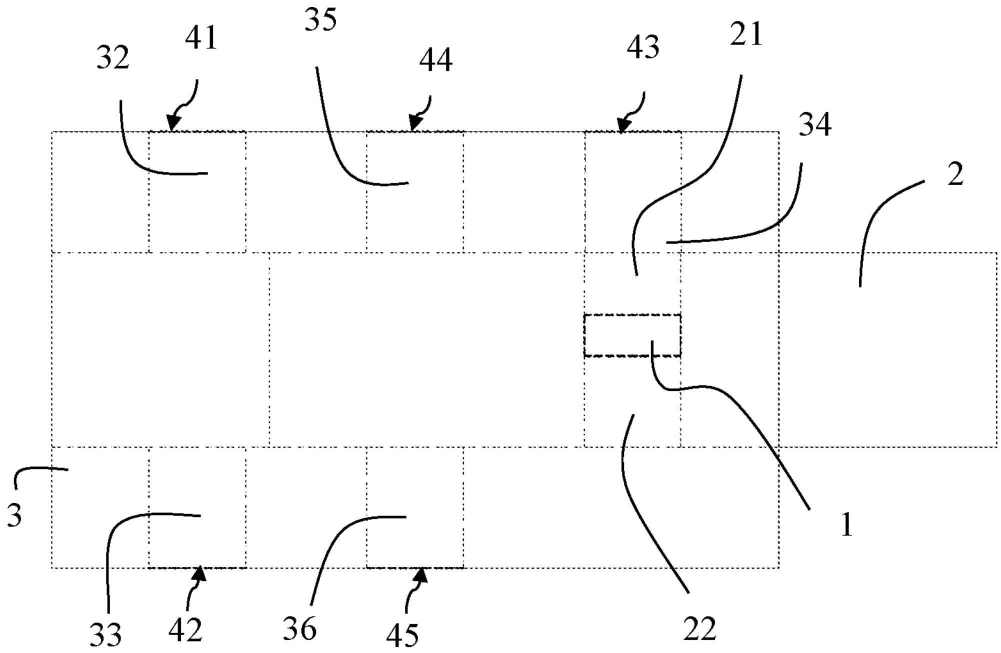
FIG. 21 is a schematic top view of the inner sleeve and the outer sleeve in a third relative position of the microphone assembly in accordance with the second embodiment of the present disclosure.

When the inner sleeve 2 and the outer sleeve 3 are in the second relative position, referring to FIG. 21, the first hole 21 communicates with the fifth hole 34, and the second hole 22 is blocked by the outer sleeve 3. That is, the front surface of the microphone 1 communicates with the outside environment, and the rear surface is blocked. At this time, all external sound waves enter the first hole 21 from the fifth hole 34, and then enter the microphone 1. Therefore, the microphone assembly as a whole exhibits an omni-directional effect.

Figure 20:
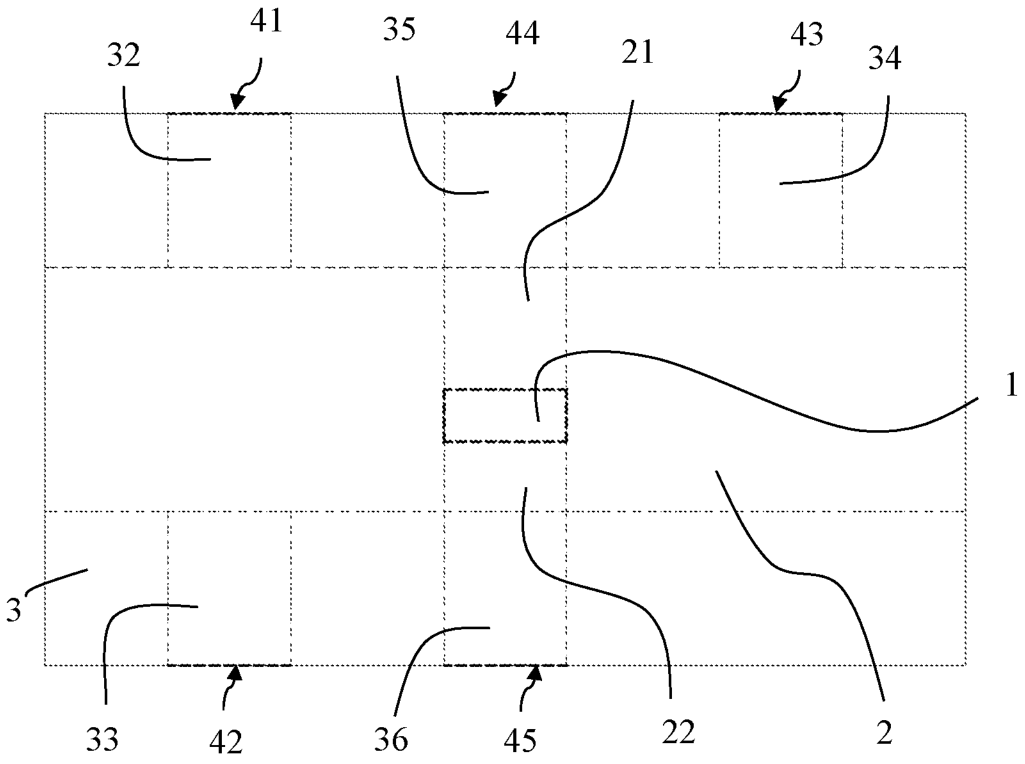
FIG. 20 is a schematic top view of the inner sleeve and the outer sleeve in a second relative position of the microphone assembly in accordance with the second embodiment of the present disclosure.

When the inner sleeve 2 and the outer sleeve 3 are in the third relative position, referring to FIG. 20, the first hole 21 communicates with the sixth hole 35, and the fourth acoustic mesh has a large acoustic impedance; and the second hole 22 communicates with the seventh hole 36, and the acoustic impedance of the fifth acoustic mesh is small. The microphone assembly as a whole exhibits close to a bi-directional effect.

In the aforementioned embodiments, the microphone 1 is a uni-directional microphone. In other embodiments of the present disclosure, the microphone 1 may also adopt a bi-directional microphone. It should be understood that as long as the microphone has sound receiving holes on two sides of its diaphragm, it has the basic condition to choose to use one side or two sides of the sound receiving holes for sound collection. When this microphone is combined with the inner sleeve 2 and the outer sleeve 3, at least two directivities can be obtained: that is, an omni-directional directivity (the sound hole on one side of the diaphragm collects sound) and one other directivity (the one other directivity here may be bi-directional, or uni-directional, or other directivity different from the bi-directional or uni-directional; the sound holes on two sides of the diaphragm collect sound).

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A microphone assembly, comprising:

a microphone comprising a shell, a diaphragm, a first sound receiving hole and a second sound receiving hole; the diaphragm being accommodated in the shell; the first sound receiving hole being located on one side of the diaphragm, and the second sound receiving hole being located on another side of the diaphragm;

an inner sleeve having a first hole and a second hole; the first hole and the second hole communicating with each other and extending through the inner sleeve; the microphone being accommodated between the first hole and the second hole; the first sound receiving hole being exposed to the first hole, and the second sound receiving hole being exposed to the second hole; and an outer sleeve having a receiving space, the inner sleeve being accommodated in the receiving space, and the inner sleeve being movable relative to the outer sleeve;

wherein the inner sleeve and the outer sleeve have at least two relative positions; and wherein in a first relative position, both the first hole and the second hole communicate with an outside environment; and in a second relative position, the first hole or the second hole communicates with the outside environment.

2. The microphone assembly according to claim 1, wherein the first hole is coaxial with the second hole.

3. The microphone assembly according to claim 2, wherein there is a first axis, and the inner sleeve is obtained by rotating a planar figure by 360° around the first axis; and wherein the first axis is perpendicular to an axis of the first hole and an axis of the second hole.

4. The microphone assembly according to claim 3, wherein the inner sleeve is of a cylindrical configuration.

5. The microphone assembly according to claim 4, wherein the microphone is fixedly connected to the inner sleeve.

6. The microphone assembly according to claim 3, wherein a shape of the receiving space matches an outer circumference of the inner sleeve; and the inner sleeve is rotatable around the first axis, so that the inner sleeve and the outer sleeve are relatively displaced.

7. The microphone assembly according to claim 6, wherein the outer sleeve has a third hole, a fourth hole and a fifth hole; one ends of the third hole, the fourth hole and the fifth hole communicate with the receiving space, and another ends of the third hole, the fourth hole and the fifth hole communicate with an outside of the outer sleeve;

in the first relative position, the first hole communicates with the third hole, and the second hole communicates with the fourth hole; or, the first hole communicates with the fourth hole, and the second hole communicates with the third hole;

in the second relative position, the first hole communicates with the fifth hole, or the second hole communicates with the fifth hole; and the second hole is blocked by the outer sleeve, or the first hole is blocked by the outer sleeve.

8. The microphone assembly according to claim 7, wherein axes of the third hole, the fourth hole and the fifth hole are substantially perpendicular to the first axis;

viewed along a peripheral side of the outer sleeve, the third hole is arranged 180° apart from the fourth hole; and the fifth hole is located between the third hole and the fourth hole.

9. The microphone assembly according to claim 8, wherein acoustic meshes are provided and fixed in the third hole, the fourth hole and the fifth hole.

10. The microphone assembly according to claim 8, wherein the microphone is a uni-directional microphone; and acoustic impedances of the acoustic meshes located in the third hole and the fourth hole are different.

11. The microphone assembly according to claim 1, wherein the inner sleeve is translatable relative to the outer sleeve along a direction, and the direction is perpendicular to an axis of the first hole and an axis of the second hole.

12. The microphone assembly according to claim 1, wherein the outer sleeve has a first set of holes and a second set of holes;

the first set of holes comprises a third hole and a fourth hole; in the first relative position, the first hole communicates with the third hole, and the second hole communicates with the fourth hole;

the second set of holes comprises a fifth hole; in the second relative position, the first hole communicates with the fifth hole, or the second hole communicates with the fifth hole; and the second hole is blocked by the outer sleeve, or the first hole is blocked by the outer sleeve.

13. The microphone assembly according to claim 12, wherein the outer sleeve further comprises a third set of holes; the third set of holes comprises a sixth hole and a seventh hole; the sixth hole and the third hole are located on one side of the outer sleeve, and the seventh hole and the fourth hole are located on another side of the outer sleeve; and wherein in the first relative position, the first hole communicates with the sixth hole; and the second hole communicates with the seventh hole.

14. The microphone assembly according to claim 13, wherein acoustic meshes are fixed in the third hole, the fourth hole, the fifth hole, the sixth hole and the seventh hole;

the microphone is a uni-directional microphone;

an acoustic impedance of the acoustic mesh located in the third hole is greater than an acoustic impedance of the acoustic mesh located in the fourth hole; and an acoustic impedance of the acoustic mesh located in the sixth hole is smaller than an acoustic impedance of the acoustic mesh located in the seventh hole.

15. A microphone assembly, comprising:

a microphone comprising a shell, a diaphragm, a first sound receiving hole and a second sound receiving hole; the first sound receiving hole and the second sound receiving hole being located opposite sides of the diaphragm;

an inner sleeve having a first hole and a second hole which is coaxial with the first hole; the microphone being accommodated between the first hole and the second hole; the first sound receiving hole being exposed to the first hole, and the second sound receiving hole being exposed to the second hole; and an outer sleeve having a receiving space, the inner sleeve being accommodated in the receiving space, and the inner sleeve being movable relative to the outer sleeve;

wherein the inner sleeve and the outer sleeve have at least two relative positions; and wherein in a first relative position, both the first hole and the second hole communicate with an outside environment; and in a second relative position, the first hole or the second hole communicates with the outside environment.

16. The microphone assembly according to claim 15, wherein there is a first axis, and the inner sleeve is obtained by rotating a planar figure by 360° around the first axis; and wherein the first axis is perpendicular to an axis of the first hole and an axis of the second hole.

17. The microphone assembly according to claim 16, wherein a shape of the receiving space matches an outer circumference of the inner sleeve; and the inner sleeve is rotatable around the first axis, so that the inner sleeve and the outer sleeve are relatively displaced.

18. The microphone assembly according to claim 17, wherein the outer sleeve has a third hole, a fourth hole and a fifth hole; one ends of the third hole, the fourth hole and the fifth hole communicate with the receiving space, and another ends of the third hole, the fourth hole and the fifth hole communicate with an outside of the outer sleeve;

in the first relative position, the first hole communicates with the third hole, and the second hole communicates with the fourth hole; or, the first hole communicates with the fourth hole, and the second hole communicates with the third hole;

in the second relative position, the first hole communicates with the fifth hole, or the second hole communicates with the fifth hole; and the second hole is blocked by the outer sleeve, or the first hole is blocked by the outer sleeve.

19. The microphone assembly according to claim 18, wherein axes of the third hole, the fourth hole and the fifth hole are substantially perpendicular to the first axis;

viewed along a peripheral side of the outer sleeve, the third hole is arranged 180° apart from the fourth hole; and the fifth hole is located between the third hole and the fourth hole.

20. The microphone assembly according to claim 19, wherein the microphone is a uni-directional microphone; and acoustic impedances of the acoustic meshes located in the third hole and the fourth hole are different.

* * * * *